US012405093B2

(12) United States Patent
Dodd

(10) Patent No.: US 12,405,093 B2
(45) Date of Patent: *Sep. 2, 2025

(54) BOX TARGET

(71) Applicant: Michael A. Dodd, Chandler, AZ (US)

(72) Inventor: Michael A. Dodd, Chandler, AZ (US)

( * ) Notice: Subject to any disclaimer, the term of this patent is extended or adjusted under 35 U.S.C. 154(b) by 103 days.

This patent is subject to a terminal disclaimer.

(21) Appl. No.: 18/499,973

(22) Filed: Nov. 1, 2023

(65) Prior Publication Data

US 2024/0077287 A1 Mar. 7, 2024

Related U.S. Application Data

(60) Continuation of application No. 17/138,489, filed on Dec. 30, 2020, now Pat. No. 11,841,213, which is a (Continued)

(51) Int. Cl.

| | |
|---|---|
| ***F41J 1/10*** | (2006.01) |
| ***B31B 50/22*** | (2017.01) |
| ***B31B 50/26*** | (2017.01) |
| ***B31B 50/73*** | (2017.01) |
| ***B31B 50/88*** | (2017.01) |
| ***B31B 110/35*** | (2017.01) |
| ***B31B 120/30*** | (2017.01) |
| ***B31B 120/70*** | (2017.01) |

(52) U.S. Cl.

CPC ................. *F41J 1/10* (2013.01); *B31B 50/22* (2017.08); *B31B 50/26* (2017.08); *B31B 50/732* (2017.08); *B31B 50/88* (2017.08); *B31B 2110/35* (2017.08); *B31B 2120/302* (2017.08); *B31B 2120/70* (2017.08); *B31B 2241/00* (2013.01)

(58) Field of Classification Search

CPC .. F41J 1/10; B31B 50/22; B31B 50/26; B31B 50/732; B31B 50/88; B31B 2110/35; B31B 2120/302; B31B 2120/70; B31B 2241/00

See application file for complete search history.

(56) References Cited

U.S. PATENT DOCUMENTS 1,804,117 A 5/1931 Russell
3,088,738 A 5/1963 Meyer
(Continued)

FOREIGN PATENT DOCUMENTS

AU 616643 B2 * 11/1991 ............. B32B 27/10
DE 102017106167 A1 9/2018

OTHER PUBLICATIONS http://web.archive.org/web/20170904203734/https://www.wikihow.com/construct-Moving-Boxed (Year: 2017).

*Primary Examiner* — Jeffrey S Vanderveen

(74) *Attorney, Agent, or Firm* — Brian M. Kaufman; Robert D. Atkins; PATENT LAW GROUP: Atkins and Associates, P.C.

(57) ABSTRACT

A firearm target is formed from a cardboard substrate. A first target is printed on the cardboard substrate. The cardboard substrate is folded into a box shape. The cardboard substrate is cut to form a first flap and a second flap on a first side of the cardboard substrate. The first flap and second flap include notches. The first flap and second flap are folded over with the notches interlocked. The flaps can be oriented to the bottom of the box shape and weighted for stability. A second target can be mounted to the box shape over the first target.

15 Claims, 17 Drawing Sheets

Related U.S. Application Data division of application No. 16/213,426, filed on Dec. 7, 2018, now Pat. No. 10,907,941.

(60) Provisional application No. 62/597,351, filed on Dec. 11, 2017.

(56) References Cited

U.S. PATENT DOCUMENTS

| | | | | |
|---|---|---|---|---|
| 3,100,642 | A | 8/1963 | Goldstein | |
| 3,202,429 | A | 8/1965 | Richman | |
| 3,817,528 | A | 6/1974 | Stuhler | |
| 4,022,472 | A | 5/1977 | Seals | |
| 4,648,548 | A | 3/1987 | Shin | |
| 4,744,568 | A | 5/1988 | Bernahl et al. | |
| 5,280,920 | A * | 1/1994 | Knapper | F41J 1/10 273/407 |
| 5,333,865 | A | 8/1994 | Holmes | |
| 6,244,598 | B1 | 6/2001 | Conville | |
| 6,755,711 | B2 | 6/2004 | McClung et al. | |
| 6,935,504 | B2 * | 8/2005 | Ritter | B65D 5/003 206/511 |
| 7,100,921 | B2 | 9/2006 | Yercha et al. | |
| 8,776,415 | B2 | 7/2014 | Kawaguchi et al. | |
| 9,482,497 | B2 | 11/2016 | Schneider | |
| 9,714,816 | B2 | 7/2017 | Temple | |
| 10,247,528 | B1 | 4/2019 | Nolan et al. | |
| 10,335,672 | B1 | 7/2019 | Devor | |
| 2007/0013138 | A1 * | 1/2007 | Hinnant | F41J 1/10 273/407 |
| 2014/0284880 | A1 * | 9/2014 | Burks | F41J 1/10 273/407 |
| 2015/0021226 | A1 * | 1/2015 | Jacomelli | B65D 5/4266 206/508 |
| 2019/0077539 | A1 | 3/2019 | Sollie et al. | |

* cited by examiner

BOX TARGET

CLAIM TO DOMESTIC PRIORITY

The present application is a continuation of U.S. patent application Ser. No. 17/138, 489, now U.S. Pat. No. 11,841, 213, filed Dec. 30, 2020, which is a division of U.S. patent application Ser. No. 16/213, 426, now U.S. Pat. No. 10,907, 941, filed Dec. 7, 2018, which claims the benefit of U.S. Provisional Application No. 62/597, 351, filed Dec. 11, 2017, which applications are incorporated herein by reference.

FIELD OF THE INVENTION

The present invention relates in general to firearms, and, more specifically, to a firearm target in the form of a cardboard box.

BACKGROUND OF THE INVENTION

Firearms have a wide variety of uses, including recreation, hunting, and self-defense. Whatever use a person puts a firearm to, an important aspect of firearm ownership is proper firearm training. Target shooting is important to practice and improve shooting skill. Target shooting is also commonly used to prove a minimum competency level or compete against others in organized competitions.

Commonly, shooters wishing to practice will take their firearms to a wilderness or rural area either designated for shooting or remote enough to be safe for shooting. A shooter will set up a target to practice with an area behind the target that is free of other people that could be injured or property that could be damaged by the shooting.

The locales selected for practice shooting may not be set up well for target practice. The shooter may have no option other than to shoot at tin cans or other objects set on the ground, in which case the shooting angle may not be realistic to the situation the shooter is practicing for. The shooter can try tacking a target up on a tree, but then the tree is undesirably damaged by the firing.

Shooting is a favorite American pastime, but setting up a proper target for self-practice remains a challenge. Therefore, a need exists for an improved firearm target.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1A:
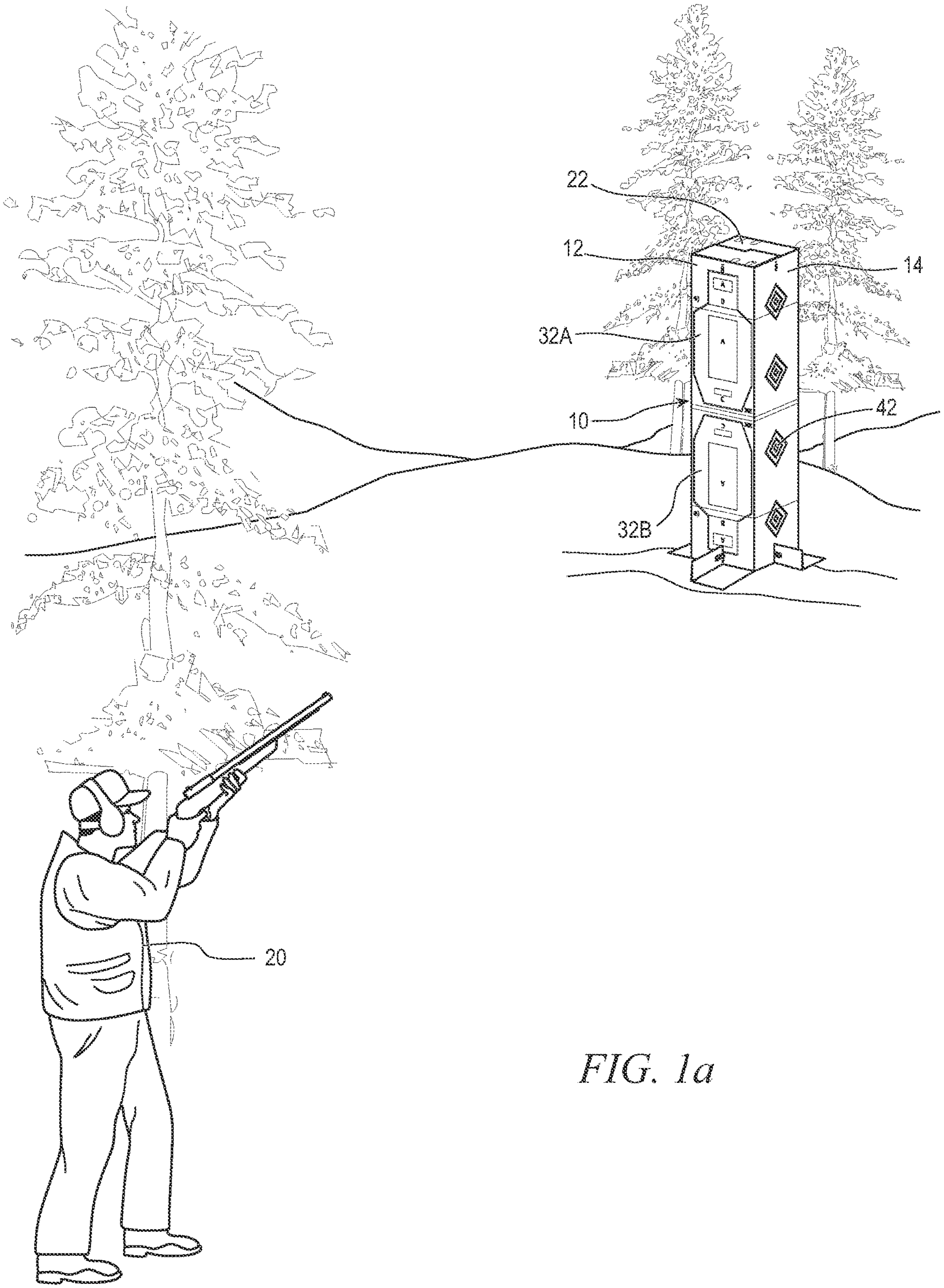
FIGS. 1*a* and 1*b* illustrate a box target.
Figure 1B:
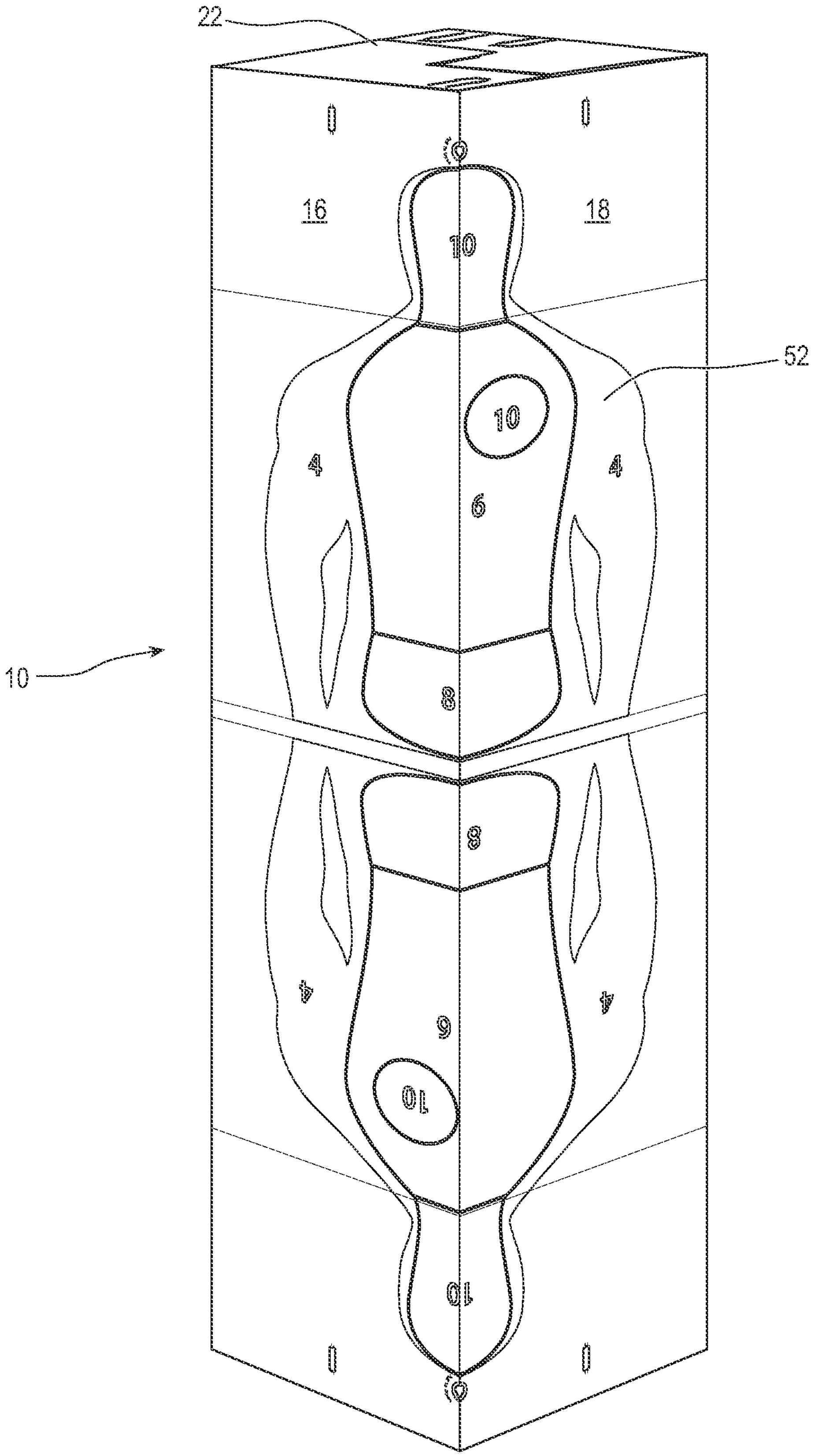

FIGS. 1*a* and 1*b* illustrate a box target 10 for use in practicing firearm shooting. Box target 10 is formed from similar materials and using similar manufacturing processes to common cardboard boxes. Box target 10 is a rectangular box and includes 6 faces like other rectangular cardboard boxes. Side faces 12, 14, 16, and 18 are oriented perpendicular to the ground and offer four different faces that shooter 20 can use as a target. End faces 22 are formed by interlocking flaps at the ends of box target 10 that are used to enclose the box and keep faces 12-18 square. In one embodiment, each side face 12-18 is a rectangle 54.3125 inches tall and 13.125 inches wide and each end faces 22 are a square 13.125 inches to a side. In other embodiments, box target 10 is formed with any suitable dimensions.

Side faces 12-18 can each have different types of targets printed on the outside of box target 10 to give shooter 20 a variety of target options. The targets are optionally printed vertically mirrored so that the top half of box target 10 includes upright targets and the lower half includes upside down targets. The top half of box target 10 is at a good vertical level for target shooting. A shooter can fire at targets on the upper half of box target 10 and then flip the box target over to begin shooting at the unused targets that were previously on the bottom half but are now on the top half. Shooter 20 can aim at the targets on the lower half of box target 10 if desired. Box target 10 is normally printed symmetrically so flipping the box target over provides the same target options. However, some embodiments have different targets printed on top and bottom of box target 10.

FIG. 1*a* shows shooter 20 firing at side face 12 of box target 10. Side face 12 includes standard ⅔ scale International Practical Shooting Confederation (IPSC) metric style targets 32. IPSC targets 32 are a standardized design commonly used in competitions and examinations. Practicing on IPSC targets 32 is desirable so that practice is performed on the same target as used in competition, or so that box target 10 can be used in competition. ISPC targets 32 include various regions marked with the letters A, B, and C. Firing and hitting the "A" regions is the most desirable, while hitting "B" or "C" regions results in a reduced score. IPSC target 32*a* is upright on the top half of box target 10, while IPSC target 32*b* is upside down. Shooter 20 can shoot at IPSC target 32*a*, and then flip over box target 10 to use IPSC target 32*b*, which remains fresh. IPSC targets 32 are provided as two-thirds scale targets due to the dimensional limitation of box target 10. However, FIGS. 6*a*-6*e* below illustrate one option for attaching a full scale IPSC target to box target 10. In addition, box target 10 can be made large enough to accommodate a full-scale IPSC target by enlarging faces 12-18 and 22.

Side face 14 is also seen in FIG. 1*a*. Side face 14 includes four diamond targets 42. Diamond targets 42 each include a plurality of concentric diamond shapes. Shooter 20 can determine the accuracy of a shot by observing which of the concentric diamonds the shot hits closest to. Other target styles can be used in other embodiments, e.g., concentric circles, non-overlapping circles, or any other arbitrary shapes. Any target design can be used on any of the faces of box target 10. Shooter 20 can turn box target 10, or move in front of face 14, to use diamond targets 42 instead of IPSC targets 32.

FIG. 1B illustrates box target 10 with faces 16 and 18 oriented toward the viewer. Side faces 16 and 18 include silhouette target 52 split across the two faces. Silhouette target 52 includes discrete regions with numbers indicating a point value received for hitting the particular region. Printing a target design across two adjacent side faces provides a larger overall target for shooter 20. Edge 54, which is the corner of box target 10 located between faces 16 and 18, is oriented toward shooter 20 for firing. Looking at both faces 16 and 18 together results in the appearance of a single target larger than any single side of box target 10. Any target design can be printed across two adjacent faces to provide a larger target than can be provided on only a single face. Any two faces can be selected. However, extending a target across the manufacturer's glue joint can create a discontinuity between the two halves of the printed target if the faces of box target 10 are not aligned properly.

Figure 2A:
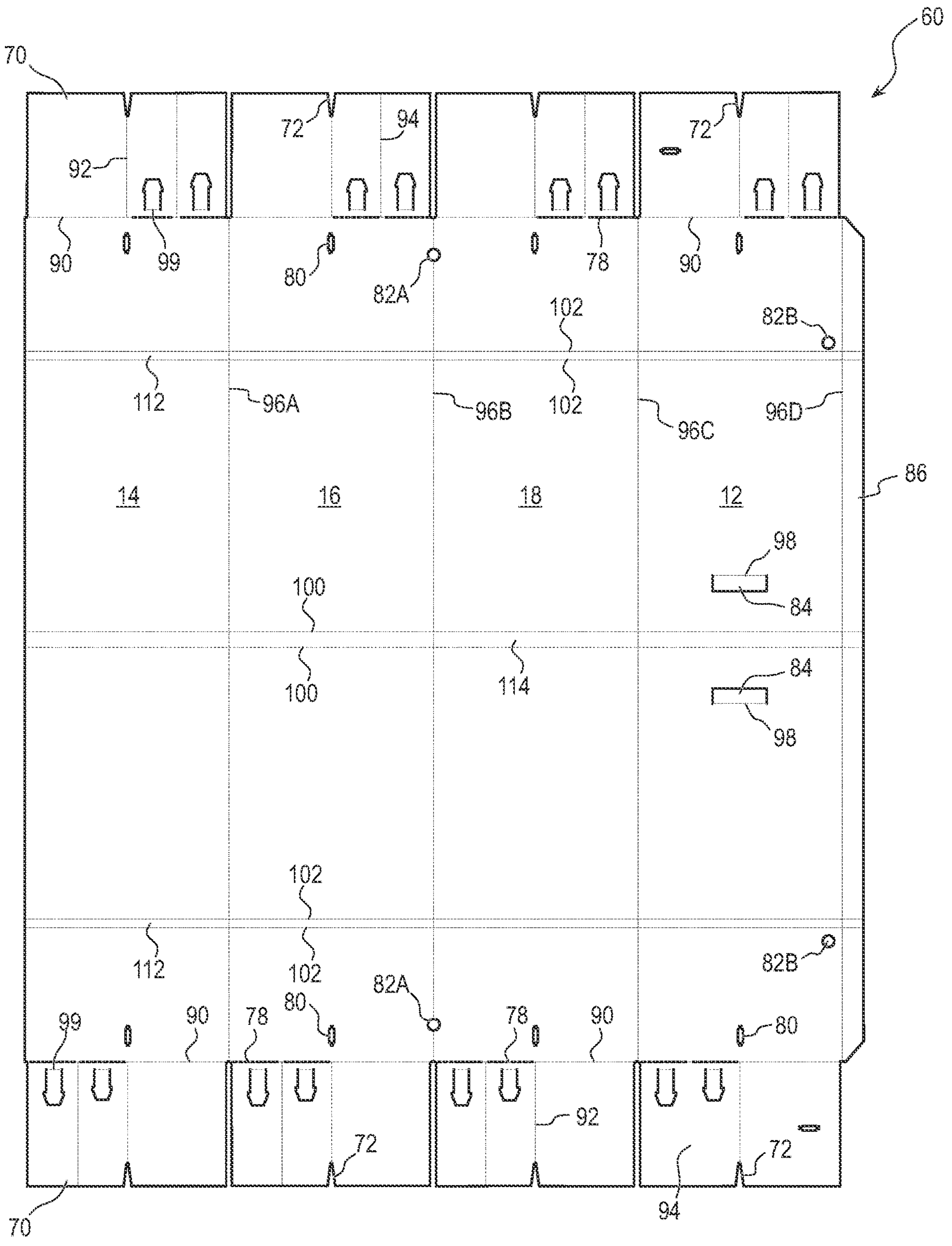
FIGS. 2*a*-2*e* illustrate manufacturing the box target and folding up the box target for distribution.

FIG. 2*a* illustrates cardboard 60 printed and cut for making box target 10. Printing is not illustrated in FIG. 2*a* to better illustrate the physical features of cardboard 60. However, the side of cardboard 60 that is visible in FIG. 2*a* will have targets printed before continuing with gluing and folding as shown in FIGS. 2*b*-2*e*. Printing can be performed before or after cutting and scoring cardboard 60. The reverse side of cardboard 60, which is not visible in FIG. 2*a*, is usually left blank. The material for cardboard 60 is biodegradable and environmentally friendly single wall board with edge crush test (ECT) grade 32, #3 White Exterior, B Flute with 33/23/33 basis weights. In another embodiment, 42/23/42 basis weights are used. Using heavier weights increases the strength of box target 10 while increasing cost.

Box target 10 can be constructed of corrugated cardboard with any suitable fluting and basis weight. Corrugation lines can be oriented vertically when box target 10 is in use to increase strength. Non-fluted cardboard stock can also be used. Other suitable materials, such as plastic, fabric, metal, or paper are used in other embodiments. The targets are printed in GCMI 74 red for increased visibility, but any suitable color is used in other embodiments.

Cardboard 60 can be cut out using a die to cut every feature required for box target 10 in a single pass. The cut-out features of cardboard 60 include flaps 70, notches 72 at the ends of the flaps, and tabs 74 in the flaps. In one embodiment, each flap 70 extends eight inches from a respective side face 12-18. Notches 72 are configured to interlock with notches 72 of an opposing flap 70, as illustrated below in FIGS. 3*b* and 3*c*, to keep the flaps closed. In addition, one flap 70 at each end of box target 10 includes an opening 76 cut out of the flap. Each flap 70 also has a perforation 78 cut into a portion of the boundary between the flap and a respective face 12-18. In one embodiment, perforations 78 are a 3/16 inch×3/16 inch perforation, meaning each individual cut of the perforation is 3/16 inches long and 3/16 inches apart from adjacent cuts.

Side faces 12-18 each have openings 80 formed at both ends, near flaps 70. Finger holes 82 are cut out near boundaries between faces, flaps 84 are cut into face 12 near the center of box target 10, and flap 86 is formed along the edge of face 12 for the length of box target 10.

In addition to cutting, cardboard 60 undergoes scoring to facilitate proper folding of box target 10. Scoring of cardboard 60 helps the cardboard bend easier and more reliably in the desired location. Scoring is imparted on cardboard by the manufacturer by pressing down on score lines with an edge that physically compresses the cardboard. The score mark makes the cardboard easier to fold by imparting a pre-bend at the desired locations. In addition, the score marks weaken the cardboard material in a linear fashion so that folds occur cleanly along the score lines when force is applied to fold the cardboard. In one embodiment, the scores for cardboard 60 are 8 point scores.

Flaps 70 have scores 90 along the boundary between the flaps and side faces 12-18, including through perforations 78. Scores 92 and 94 are formed through flaps 70 perpendicularly to score 90. Score 92 is formed at the center of flaps 70 and extends to notch 72. Score 94 is formed between the two tabs 74 of each flap 70. Scores 96 are formed at the boundary between each face 12-18 and flap 86. Scores 98 are formed at the bottom of flaps 84, and scores 99 are formed at the bottom of tabs 74. Scores 100 and 102 are formed perpendicularly to scores 96 for folding box target 10 into a manageable size for storage and shipment. The purpose of each cut and score of cardboard 60 is explained in more detail below with reference to how those features aid in assembling, deploying, and using box target 10.

To begin assembling box target 10 from cardboard 60, the cardboard is first folded along scores 96 so that flap 86 is disposed behind face 14. An adhesive is sprayed, rolled, or otherwise disposed on flap 86 or the back of face 14 to attach the flap. The interface between flap 86 and face 14 is referred to as the manufacturer's glue joint. In other embodiments, flap 86 is stapled, sewn, or otherwise attached to face 14.

Figure 2B:
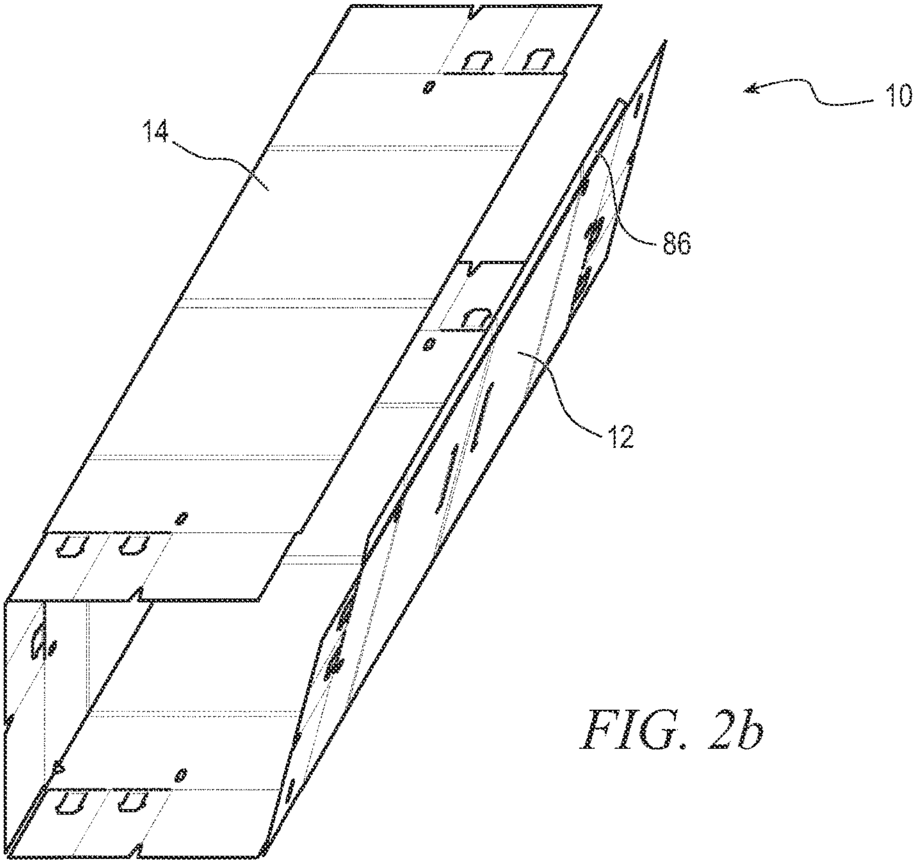
Figure 2C:
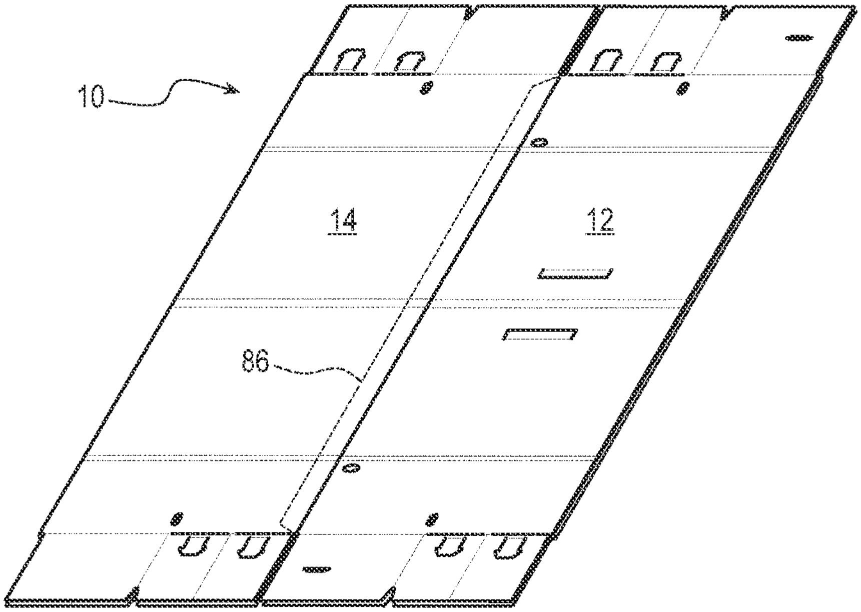

FIG. 2*b* shows cardboard 60 formed into a tube with face 14 over flap 86 to show the relative positions of faces 12-18 and flap 86 when box target 10 is assembled. However, in other embodiments cardboard 60 remains in a flat configuration for gluing of flap 86, as illustrated in FIG. 2*c*. Cardboard 60 is placed on a flat surface with the printed side oriented down. Face 12 is folded across score 96*c* so that flap 86 is near score 96*b*. Then, face 14 is folded across score 96*a* so that the back of face 14 is on top of flap 86. Scores 96*b* and 96*d* are not folded yet, and are now vertically aligned near the center of cardboard 60.

Figure 2D:
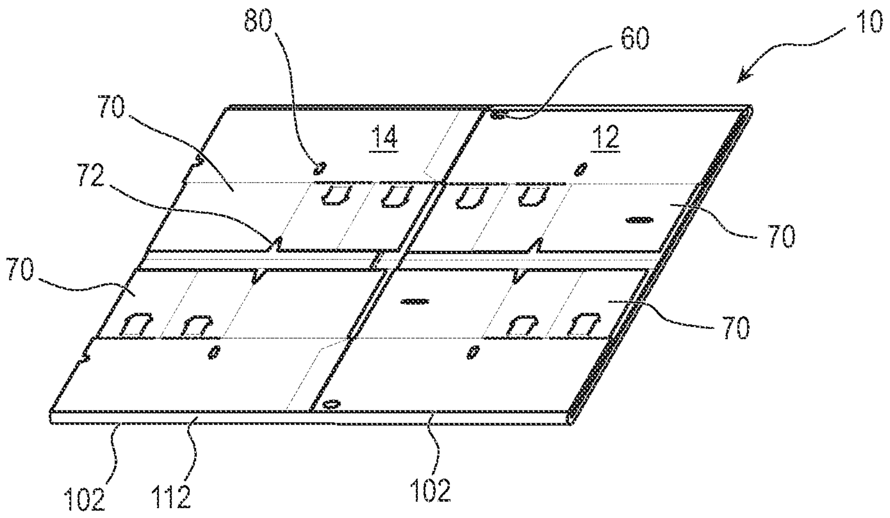

With flap 86 glued to face 14, box target 10 is now ready for use. Box target 10 can be stood up vertically and used as a target. However, normally box target 10 will be packaged for sale rather than immediately used by an end user. FIG. 2*d* shows beginning to package box target 10 by folding cardboard 60 along scores 102.

Box target 10 is laid flat, with faces 16-18 oriented upward and faces 12-14 oriented down. Faces 12-18 can be in any orientation. Face 14 is the most convenient to print branding, instructions, and other non-functional text on. Having face 14 oriented downward when folding over scores 102 allows the printing on face 14 to be visible when packaging is complete. However, having faces 12 and 14 oriented upward may also be convenient due to score 96*d* already being oriented upward after gluing flap 86. Moreover, instructions and branding can be printed on any face 12-18 or added as a sticker or insert later. Box target 10 is folded along scores 102 in FIG. 2*d*. Scores 102 are formed at approximately halfway between the ends of flaps 70 and the centrally located scores 100. In other words, scores 102 are formed at approximately 1/4 and 3/4 of the full length of box target 10 including flaps 70.

When completely folded along scores 102, the ends of flaps 70 each extend to near the middle of box target 10 at scores 100. Scores 102 are optionally formed in pairs. A surface 112 between the pairs of scores 102 provides some distance between the two portions of box target 10 on either side of scores 102. The offset provided by surface 112 helps the two sides of the fold to lie flat and parallel to each other. The area of cardboard 60 between scores 102 can be crushed during manufacturing to further aid in folding. In one embodiment, the distance between adjacent scores 102 is 9/16 inches.

Score 100 is also formed as a pair of scores in some embodiments, and cardboard 60 can be crushed between the two scores 100. A surface 114 between scores 100 provides some distance between the two sides of the fold along scores 100, similarly to surface 112 for scores 102. Scores 100 are further apart than scores 102, one inch in some embodiments. Box target 10 is next folded along scores 100 with flaps 70 between the two sides of the fold. Surface 114 is wide enough to allow the full thickness of four stacked flaps 70 between the two sides of the fold.

Figure 2E:
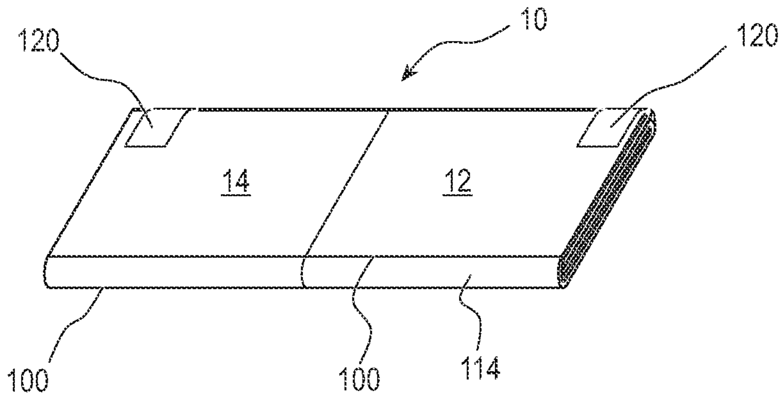

FIG. 2*e* shows the fold along scores 100 completed. Box target 10 remains substantially flat, and is folded into a rectangle that is convenient for storage, transportation, and sale. Tape 120 is used to keep box target 10 folded up until sold and ready for use. In other embodiments, box target 10 can be shrink wrapped, clipped, or kept folded using any other suitable mechanism. Box target 10 in FIG. 2*e* is ready for sale. Any needed branding, marketing information, bar codes, etc., are printed on the visible portion of either face 12 or face 14 to be visible on store shelves without unfolding box target 10. Instructions and more detailed information that is not necessarily viewed prior to purchase can be printed on other surfaces that are not visible in FIG. 2*e*. A folded box target 10 has a shipping size of approximately 18 inches×26 inches×1 inch and weighs approximately 3 pounds. While one specific folding pattern is taught, any suitable folding pattern is used in other embodiments.

Figure 3A:
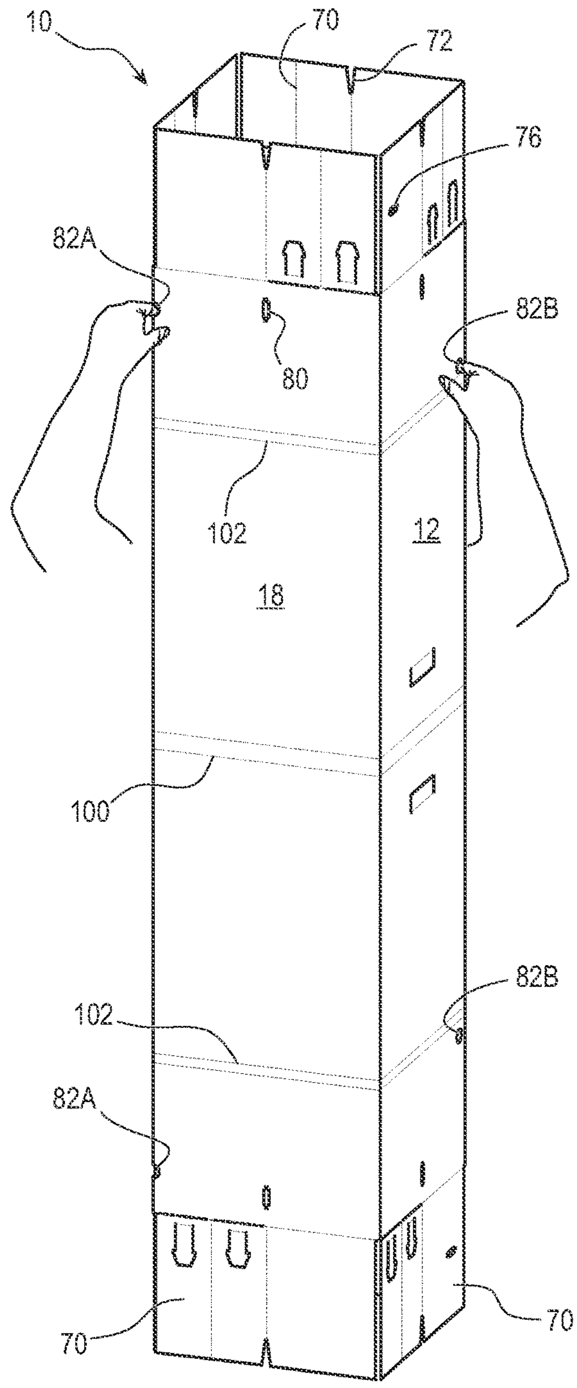
FIGS. 3*a*-3*c* illustrate deploying the box target.
Figure 3B:
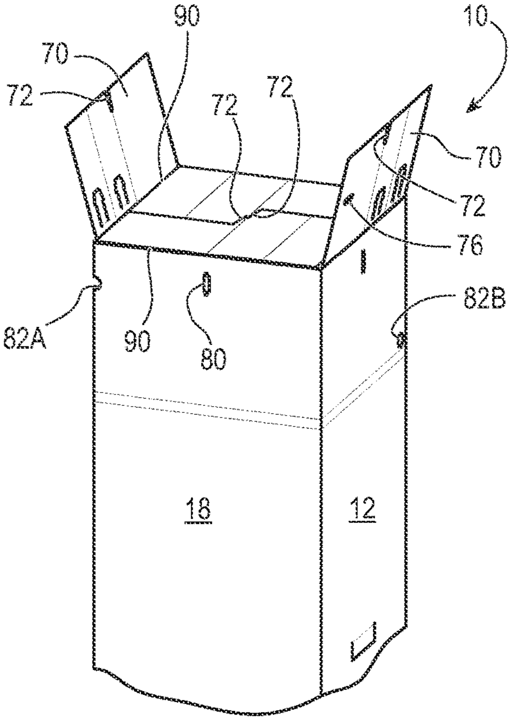
Figure 3C:
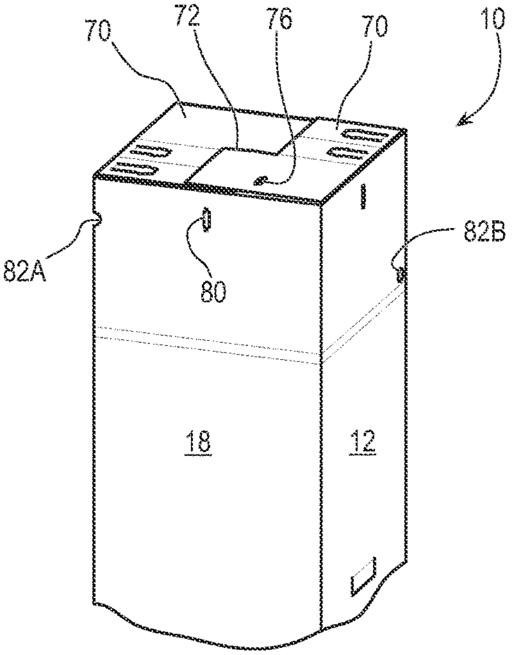

FIGS. 3*a*-3*c* illustrate shooter 20 deploying box target 10 after purchase. Shooter 20 initially cuts or removes tape 120 and unfolds box target 10 in the reverse order of steps shown above in FIGS. 2*c*-2*e*. After unfolding box target 10 along scores 100 and 102, shooter 20 positions the box target vertically with flaps 70 at the top and bottom as shown in FIG. 3*a*. Shooter 20 inserts his or her fingers into finger holes 82 to pull box target 10 from flat to tubular.

Box target 10 includes two pairs of finger holes 82. Both ends of box target 10 include a pair of finger holes so that opening box target 10 is the same action no matter which end is oriented up in FIG. 3*a*. Finger holes 82*a* and 82*b* are formed offset from each other so that the two finger holes do not combine to form a hole extending completely through box target 10 when folded flat. Shooter 20 inserts a finger of his left hand into finger hole 82*a* and presses against cardboard on the opposite side of box target 10 rather than having his finger also go through finger hole 82*b*. Likewise, the right finger of shooter 20 is inserted through finger hole 82*b* and presses against cardboard on the opposite side. Shooter 20 could also open box target 10 with finger hole 82*b* on the left and finger hole 82*a* on the right. Offset finger holes 82 help shooter 20 easily locate the middle of box target 10. Finger holes 82*a* and 82*b* can be formed directly across from each other, but inserting a finger between the layers of cardboard is more challenging without having the opposite side surface to press on through the finger holes.

Finger holes 82 have a ½-inch radius. Finger hole 82*a* is formed directly on score 96*b* near the top of side faces 16 and 18, approximately 1 and ⅞ inches from flap 70. Finger hole 82*b* is formed lower and on side face 12, slightly off of score 96*d* to ease logistical issues with forming an opening that overlaps the manufacturer's glue joint. Opening 82*b* is ⅜ inches from score 96*d* and ⅞ inches from the nearest score 100. Finger holes 82 can be any suitable size and at any suitable location on cardboard 60 in other embodiments.

With fingers inserted into finger holes 82, shooter 20 pulls box target 10 open until side faces 12-18 approximately form a square when viewed from above. Shooter 20 then engages flaps 70 to close box target 10 and maintain the shape of the box target. Two opposing flaps 70 are folded down in FIG. 3*b* and interlocked using notches 72. Notches 72 are formed at the middle of flaps 70 so that opposing notches are aligned with each other when the flaps are folded in. Each flap 70 extends over half the way across box target 10, so that opposing flaps overlap. Each flap 70 is disposed over the opposite flap on one side of notches 72, and under the opposite flap on the other side of notches 72. In some embodiments, the bottoms of all notches 72 are formed to sit approximately at the center of the square formed by side faces 12-18 so that interlocked notches fit together tightly.

In FIG. 3*c*, the remaining two flaps 70 are folded over and interlocked using notches 72. In some embodiments, flaps 70 attached to faces 12 and 16 are folded first to facilitate use of opening 76 with an auxiliary target as shown in FIG. 6*c*. However, the flaps can be folded in any order. Interlocking flaps 70 using notches 72 helps box target 10 maintain a box shape. The sides of interlocked notches 72 press against each other to resist forces that would otherwise fold box target 10 along scores 96. In addition, each flap 70 is held down by an opposite flap 70 because each flap is on top of the other on one side of notch 72.

With all four flaps 70 on top of box target 10 engaged, shooter 20 flips over the box target and engages flaps 70 on the other end of the box target in the same manner. Box target 10 a cardboard box, now usable as a firearm target. Box target 10 can typically be stood up on one end face 22 after folding flaps 70, and the box target will stay upright. Bullets fired at box target 10 tear through the cardboard easily without significant energy being transferred from the bullets to the target. Box target 10 easily withstands bullet fire without falling over because the relatively weak cardboard material does not provide significant resistance to the motion of bullets.

Figure 4A:
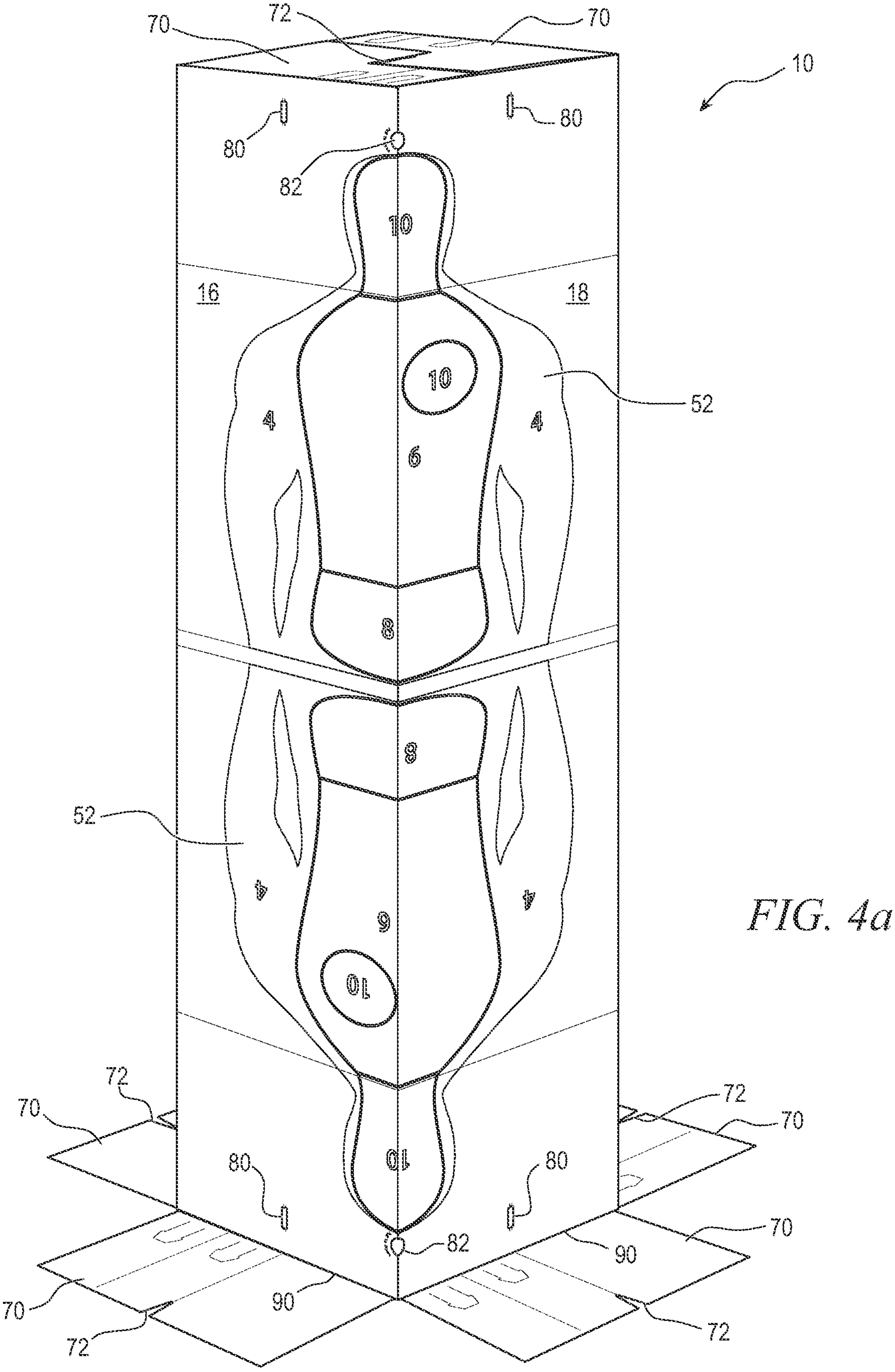
FIGS. 4*a*-4*c* illustrate using weight to stabilize the box target.

On the other hand, wind or unlevel ground could be a problem for keeping box target 10 upright. Flaps 70 on the bottom of box target 10 can be unfolded as shown in FIG. 4*a* to provide a mechanism for holding the box target upright. Any kind of weight can be added on top of the bottom flaps 70 to hold down box target 10. Shooter 20 can use anything found nearby, e.g., logs, sand, or rocks, to weigh down the box target. Shooter 20 can also keep flaps 70 at the bottom of box target 10 closed and add weight into the inside of the box target before closing the top flaps 70. Another option is for shooter 20 to attach flaps 70 to the ground using stakes.

Figure 4B:
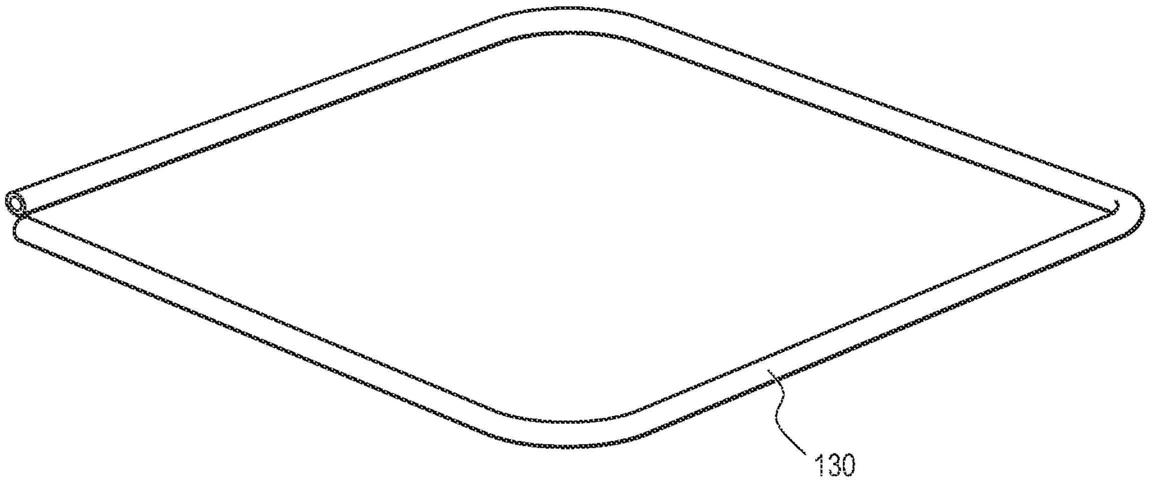
Figure 4C:
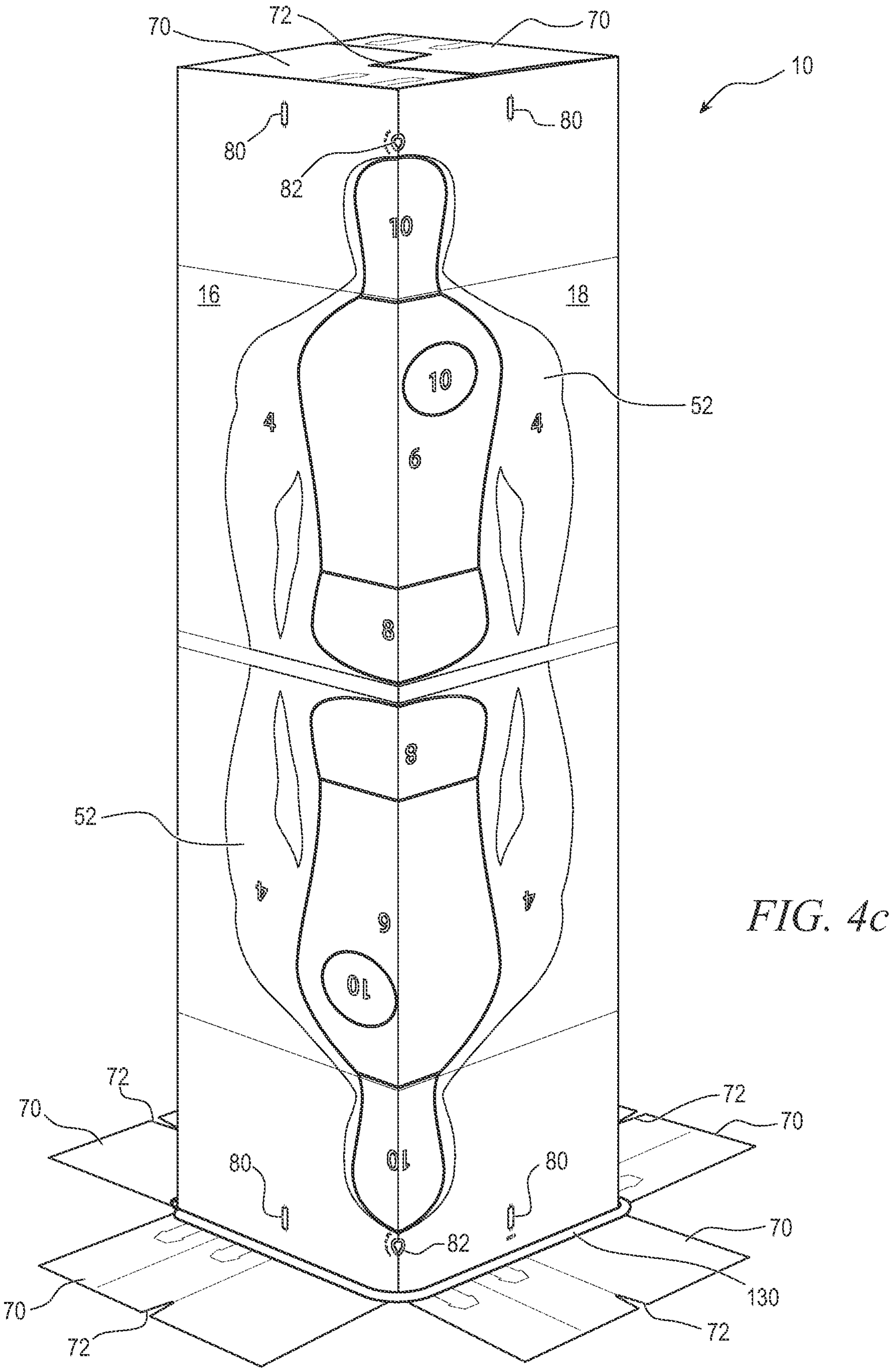

While any suitable objects with sufficient weight and density can be used to hold flaps 70 onto the ground, FIG. 4*b* illustrates a square frame weight 130 that can be sold or provided as an accessory to box target 10. Weight 130 is a metal bar bent into a square with a length and width slightly larger than the square formed by sides 12-18. In one embodiment, weight 130 is a 5-pound ⅝" diameter steel rod bent into a 15-inch×15-inch square. Shooter 20 can dispose weight 130 over the top of box target 10, and slide the weight down the box target until the weight rests on the bottom flaps 70 as shown in FIG. 4*c*. Weight 130 presses down on all four flaps 70 on the bottom end of box target 10 by the force of gravity. The weight on flaps 70 keeps box target 10 in place due to the attachment of flaps 70 to faces 12-18. In addition, the square shape of weight 130 helps keep faces 12-18 perpendicular to each other without flaps 70 interlocked via notches 72. When shooter 20 desires to flip box target 10 to have fresh targets to shoot at, the weighed down flaps in FIG. 3*c* are folded with notches 72 engaged to become the top flaps. Top flaps in FIG. 3*c* are opened to have weight added at the bottom of the box target.

As an alternative to weighing down flaps 70, the lower flaps can be folded into legs to prop up box target 10. FIGS. 5*a*-5*e* illustrate creating support legs out of flaps 70. The process is illustrated as being performed on the top flaps 70 because assembling the flaps into legs near arm level is more convenient than at ground level. The top flaps 70 can be folded into legs as illustrated, and then box target 10 flipped to have the folded flaps at the bottom of box target 10.

Figure 5A:
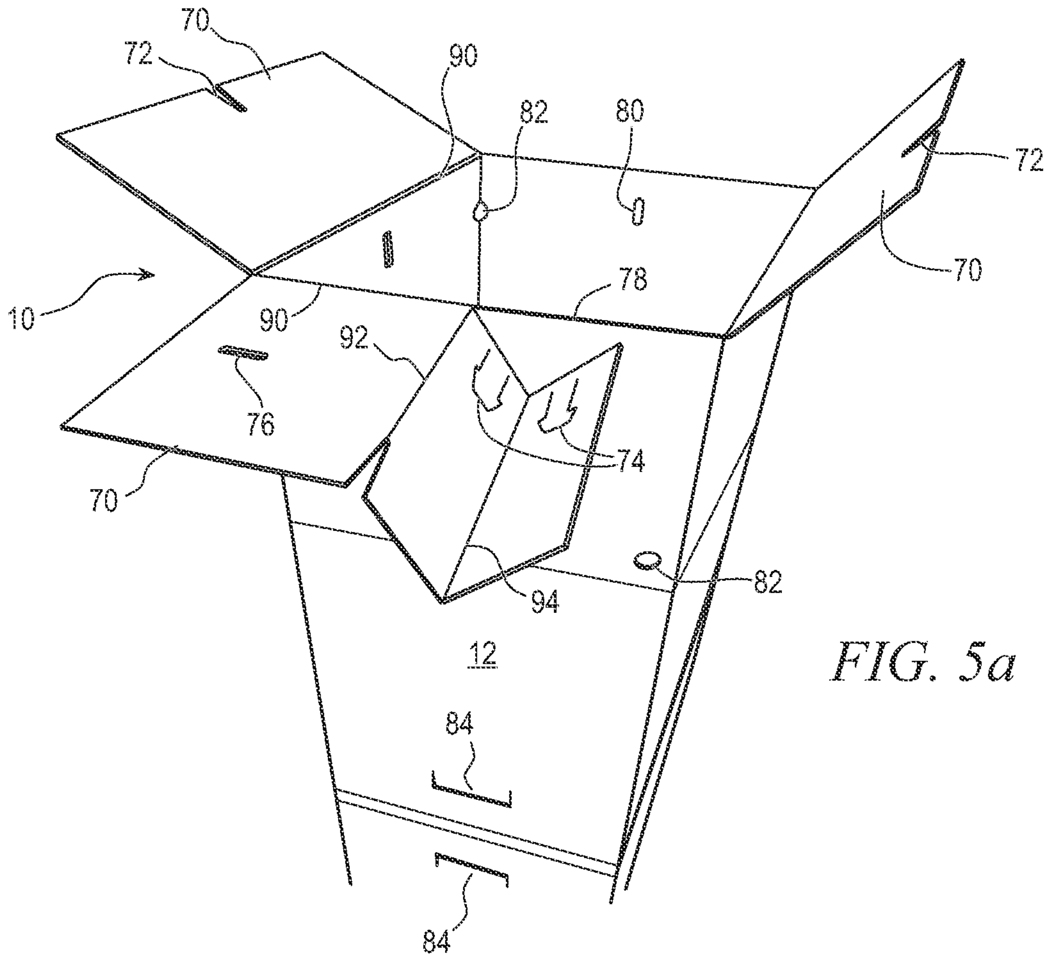
FIGS. 5*a*-5*e* illustrate using flaps of the box target as feet to stabilize the box target.
Figure 5B:
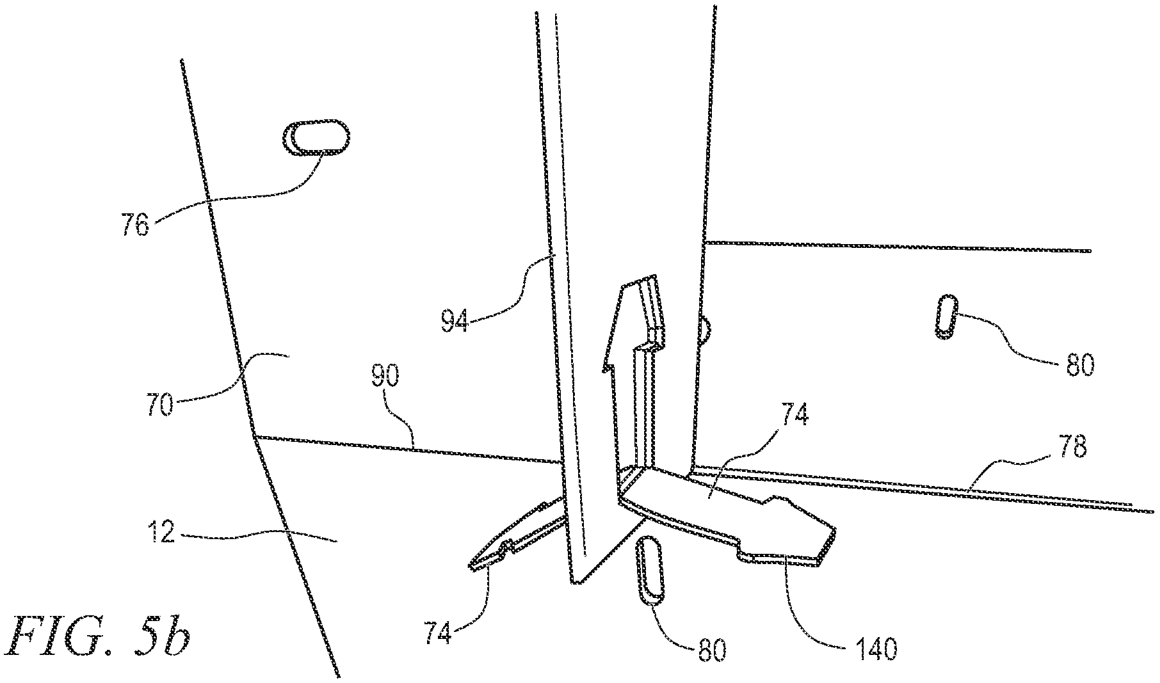

In FIG. 5*a*, perforation 78 of a flap 70 is torn to partially separate the flap from a corresponding side face 12-18. Flap 70 is folded along scores 92 and 94 to give flap 70 an extension upward in front of the side face 12-18. In one embodiment, flap 70 is folded at a ninety-degree angle at score 92 and then folded back onto itself at score 94, as illustrated in FIG. 5*b*. Score 94 can be folded either toward perforation 78 or away from the perforation.

Figure 5C:
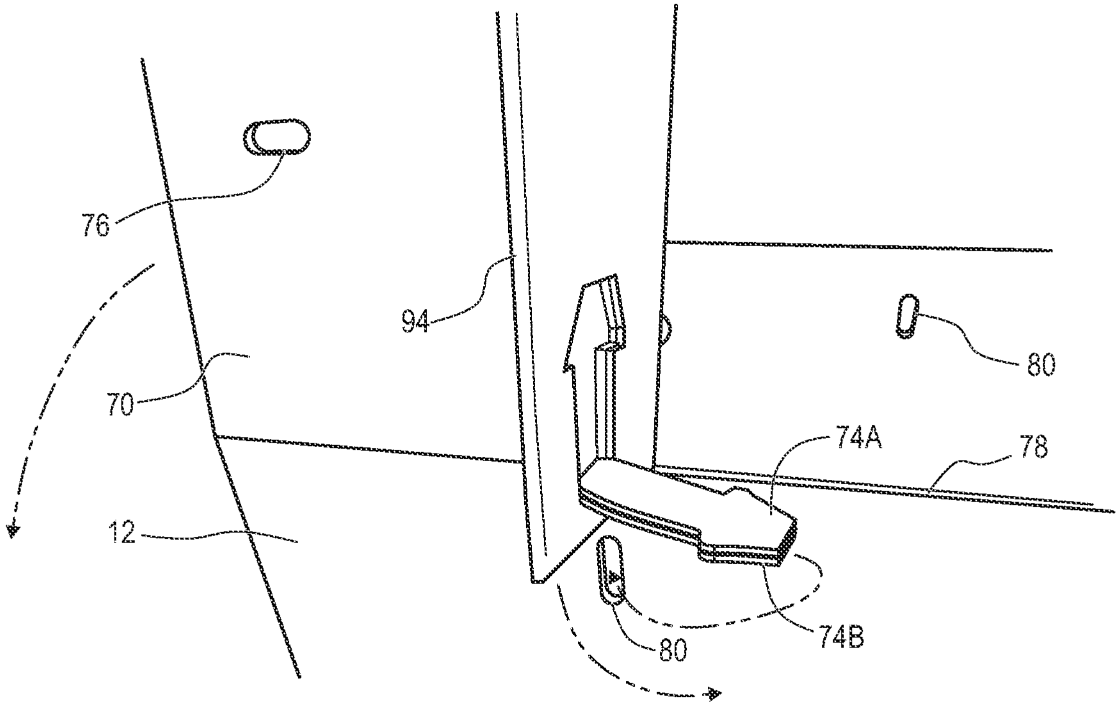
Figure 5D:
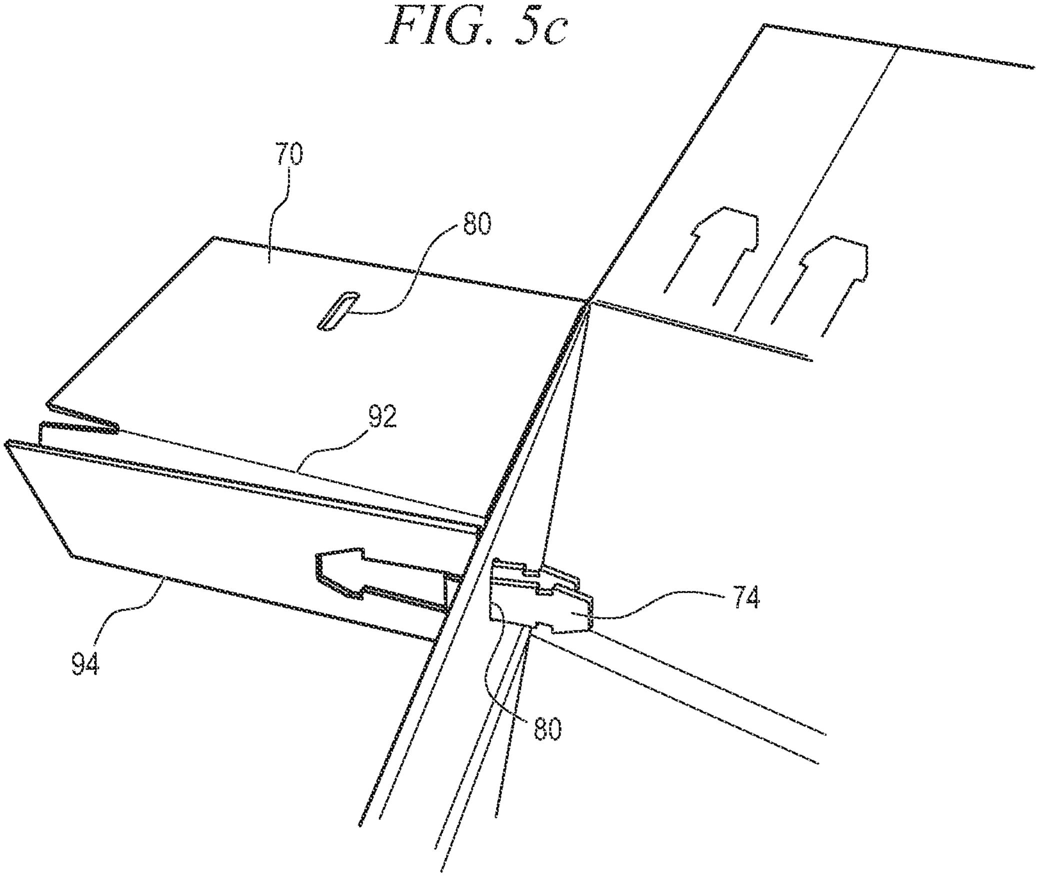

In addition to folding flap 70 along scores 92 and 94, tabs 74 are folded down toward the corresponding face 12-18 along scores 99. The two tabs 74 can be folded in opposite directions from each other as shown in FIG. 5*b*, or in the same direction as shown in FIG. 5*c*, irrespective of the folding direction along score 94. The folded-back tabs 74 are inserted into opening 80 as shown in FIG. 5*d*. The two tabs 74 folded into a single opening 80 apply counter pressure to each other to help hold the tabs into the opening. Tabs 74 also have heads 140 with corners that resist forces pulling the tabs out of opening 80. Heads 140 help keep tabs 74 from being pulled out of opening 80 during use of box target 10.

In one embodiment, tab 74*a* is cut into flap 70 with a greater length than tab 74*b*. With tabs 74*a* and 74*b* folded the same direction as shown in FIG. 5*c*, tab 74*a* extends through the hole left by tab 74*b* and then downward. Tab 74*a* is slightly longer to make up for the length of the tab that extends through flap 70, thereby putting the heads of both tabs 74 at approximately the same length through opening 80. Either tab 74 can be made longer, and shooter 20 is instructed that the longer tab should be extended through the opening of the shorter tab.

Figure 5E:
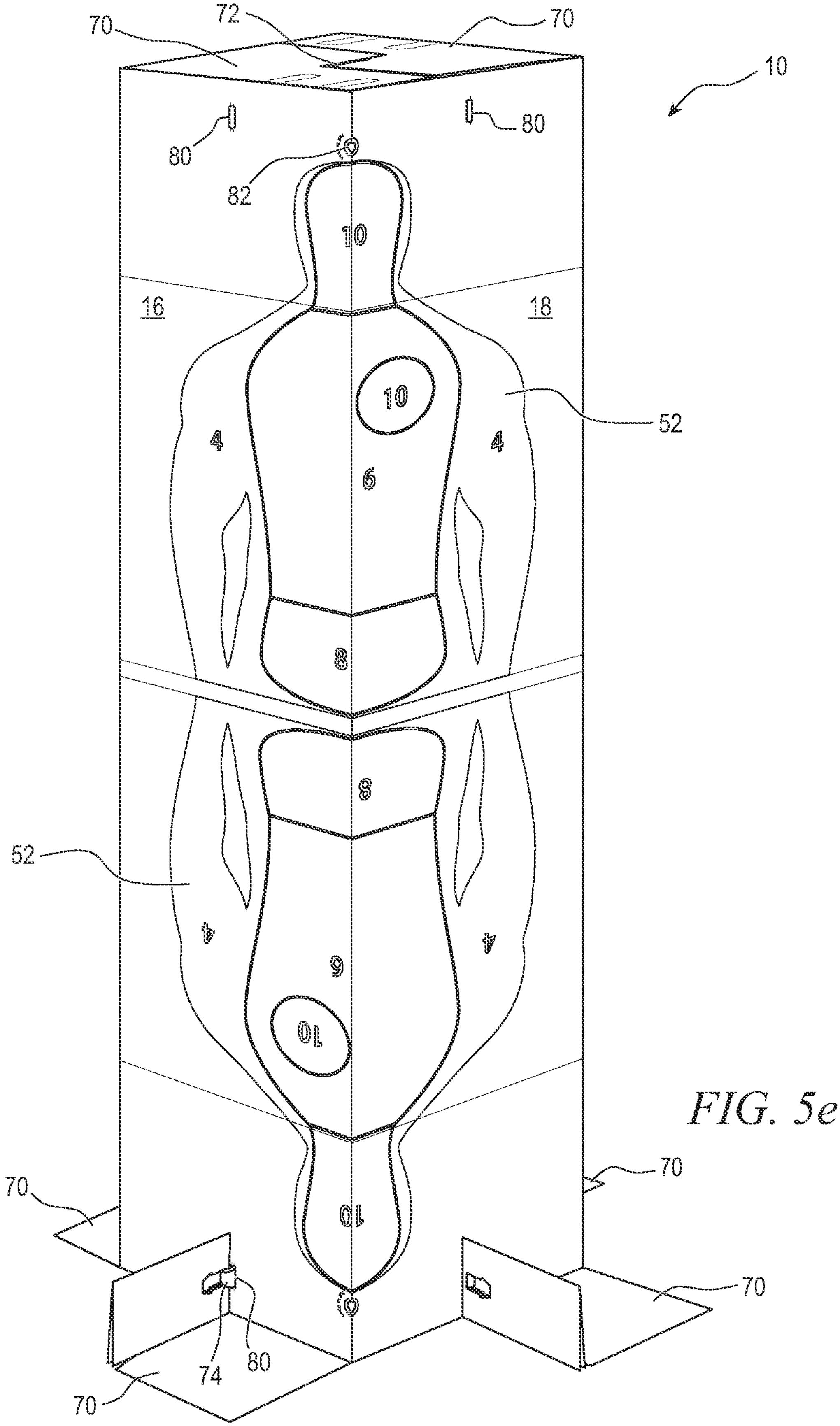

The process in FIGS. 5*a*-5*d* is repeated for all four flaps 70 on one end of box target 10 to complete the full set of four legs. Then, box target 10 is flipped so that the folded flaps 70 are at the bottom end of the box target as shown in FIG. 5*e*. Tabs 74 inserted into openings 80 maintain the fold of flap 70 upward. Any force on box target 10, for instance from blowing wind, results in one or more faces 12-18 in the downwind direction pressing against the portion of flaps 70 extending upward. The force is converted downward into the ground by flaps 70, which extend outward from faces 12-18 to increase leverage. The ground resists the force to keep box target 10 oriented upright. Using flaps 70 as fold-out feet allows box target 10 to be self-supported. No added frames or stakes are needed. The flap 70 feet help support the target on uneven ground or in breezes. The fold-out feet are usually sufficient in up to around 5 mile per hour (mph) winds. The accessory weight 130 is usually sufficient for up to around 12 mph winds.

Figure 6A:
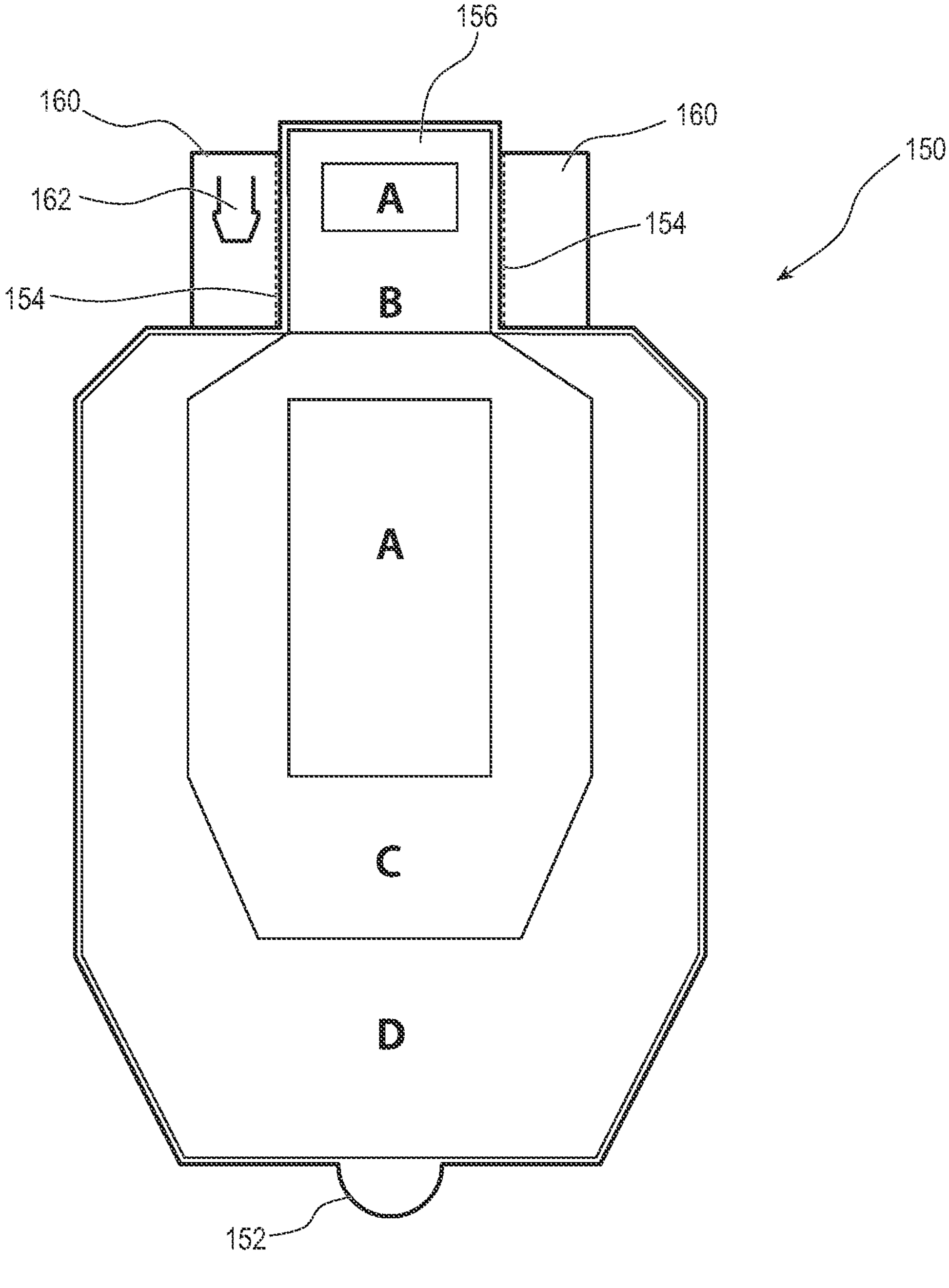
FIGS. 6*a*-6*e* illustrate using the box target as a substrate for a supplemental target.
Figure 6B:
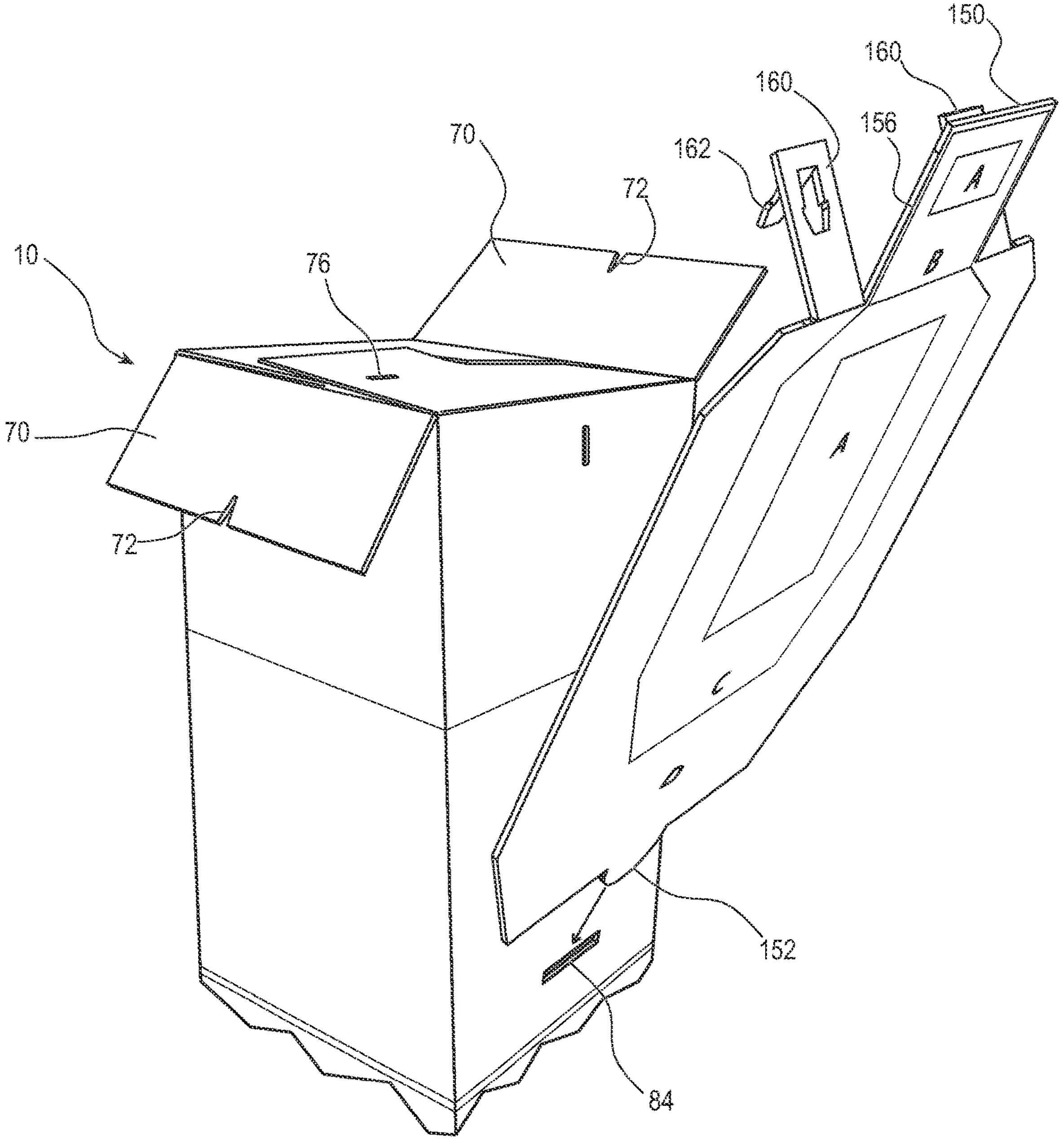
Figure 6C:
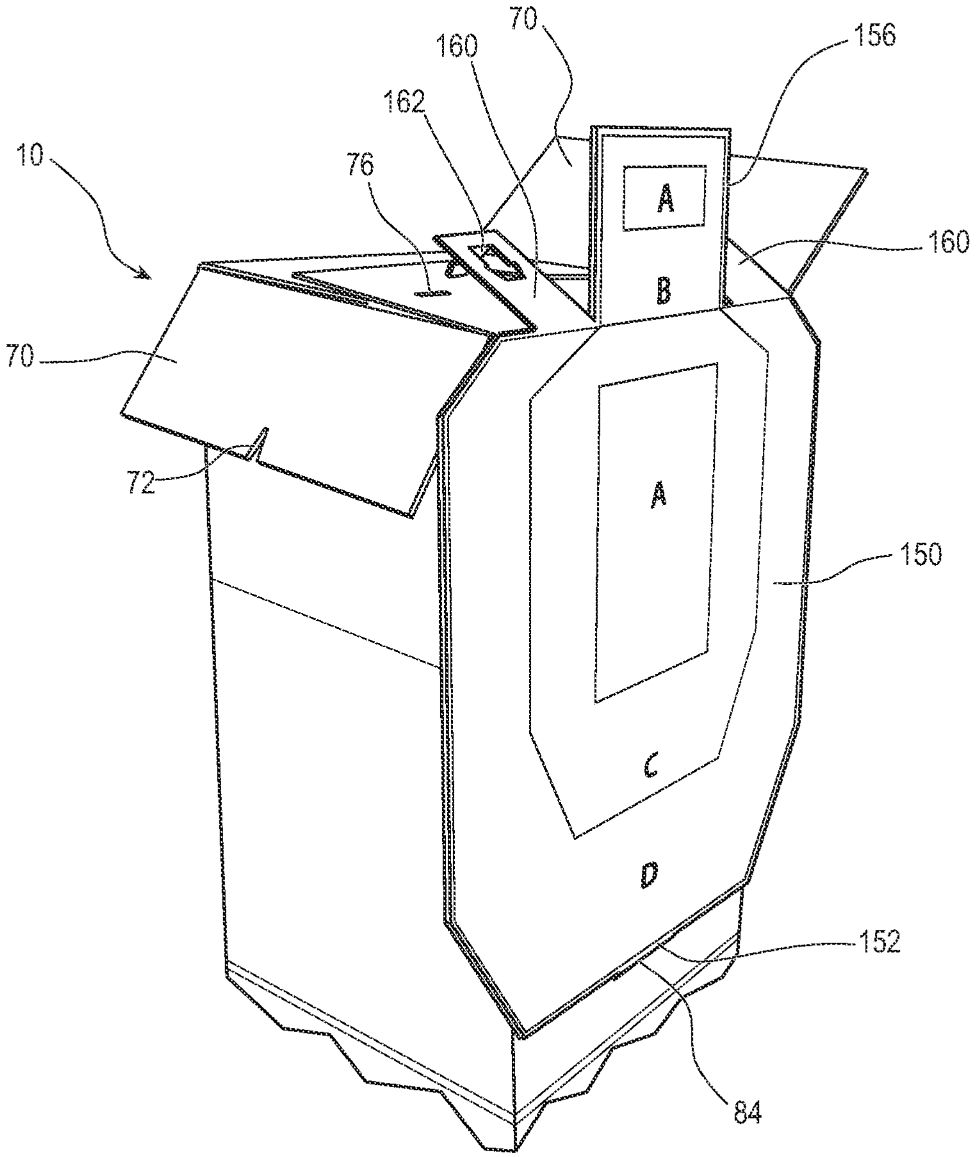

FIG. 6*a* shows a full size IPSC target 150 that is an accessory to box target 10. The target printed on IPSC target 150 is similar to ⅔ IPSC target 32 but larger. In one embodiment, IPSC target 150 has a width of 46 centimeters and a height of 76 centimeters. Like cardboard 60, IPSC target 150 is formed from a cardboard material in some embodiments and has various features cut and scored. The cut features include a tab 152 on the bottom of target 150 and perforations 154 between head 156 and flaps 160 of the target. In one embodiment, perforations 154 are a ⅛ inch by ⅛ inch. One of the flaps 160 includes a tab 162 cut into the flap. Score lines are formed at the bottom of flaps 160 for folding the flaps down, and where tab 162 is attached to the rest of flap 160.

Target 150 is installed onto box target 10 as illustrated in FIGS. 6*b*-6*e*. Shooter 20 pushes in flap 84 and inserts tab 152 of target 150 into the opening of flap 84. In one embodiment, tab 152 on target 150 is a half-circle with a radius of 1.5 inches, and flap 84 is 3.5 inches across by 1.0 inches tall. The bottom of target 150 around tab 152 rests on the bottom of the flap 84 opening to support the weight of the accessory target. Tab 152 extends behind side face 12 of box target 10, which keeps the bottom of full size IPSC target 150 close to box target 10.

FIG. 6*c* shows the top of target 150 pushed back so that target 150 is flat on side face 12 with tab 152 still in the opening of flap 84. Box target 10 has flaps 70 over side faces 12 and 16 already folded down and interlocked. Opening 76 is visible in the flap 70 toward target 150. Perforations 154 are broken if necessary, and flaps 160 are folded down onto flap 70. Tab 162 is folded down and inserted into opening 76. As with tabs 74, tab 162 includes a head to help keep the tab in opening 76. In some embodiments, two openings 76 are formed in flap 70, and both flaps 160 of target 150 include tabs 162.

Figure 6D:
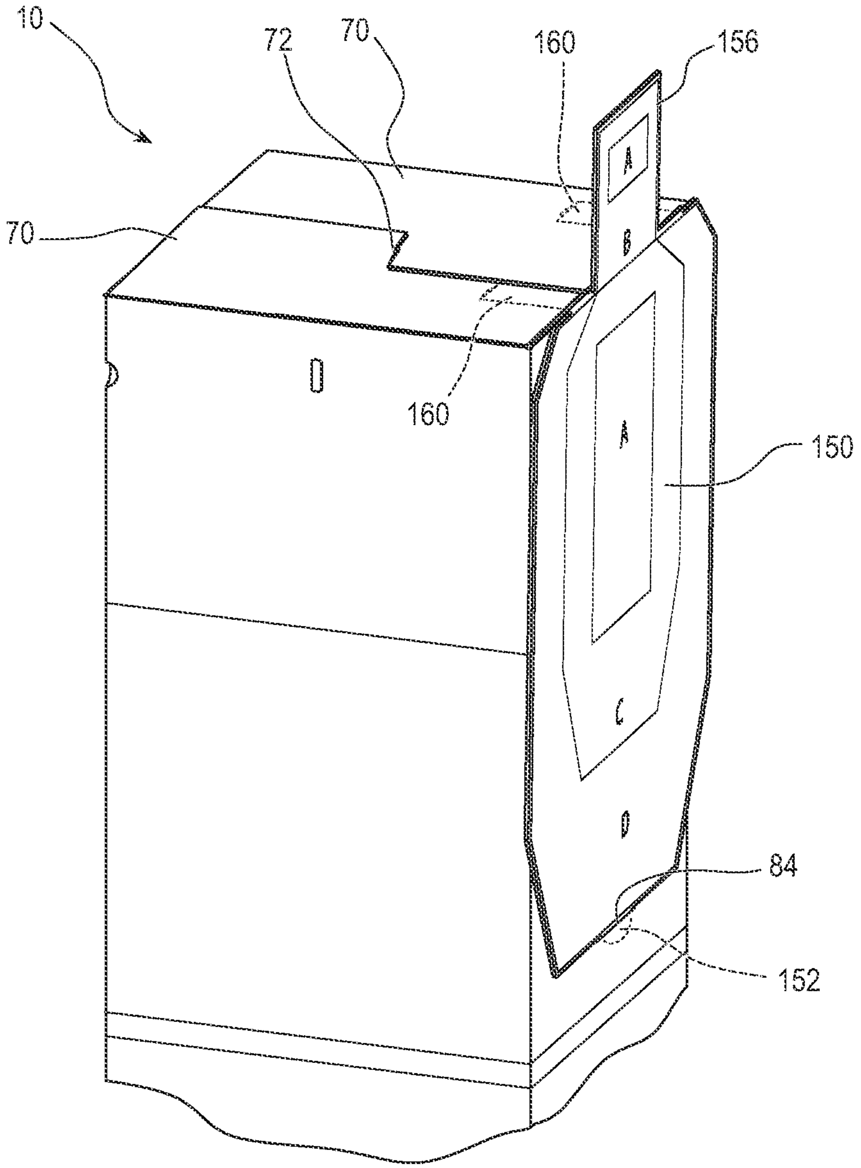

In FIG. 6*d*, the two remaining flaps 70 of box target 10 are folded down on top of flaps 160 of target 150. Flaps 70 are interlocked over flaps 160 to help keep all the flaps in place. Flap 70 over tab 162 helps keep the target 150 tab in opening 76. In other embodiments, tab 162 is not used. Flaps 160 can be inserted between, and removed from, flaps 70 without having to undo flaps 70 of box target 10. Tab 162 helps keep flaps 160 in place between flaps 70 when, e.g., wind blows the back of target 150, but is not necessary for use of target 150.

Figure 6E:
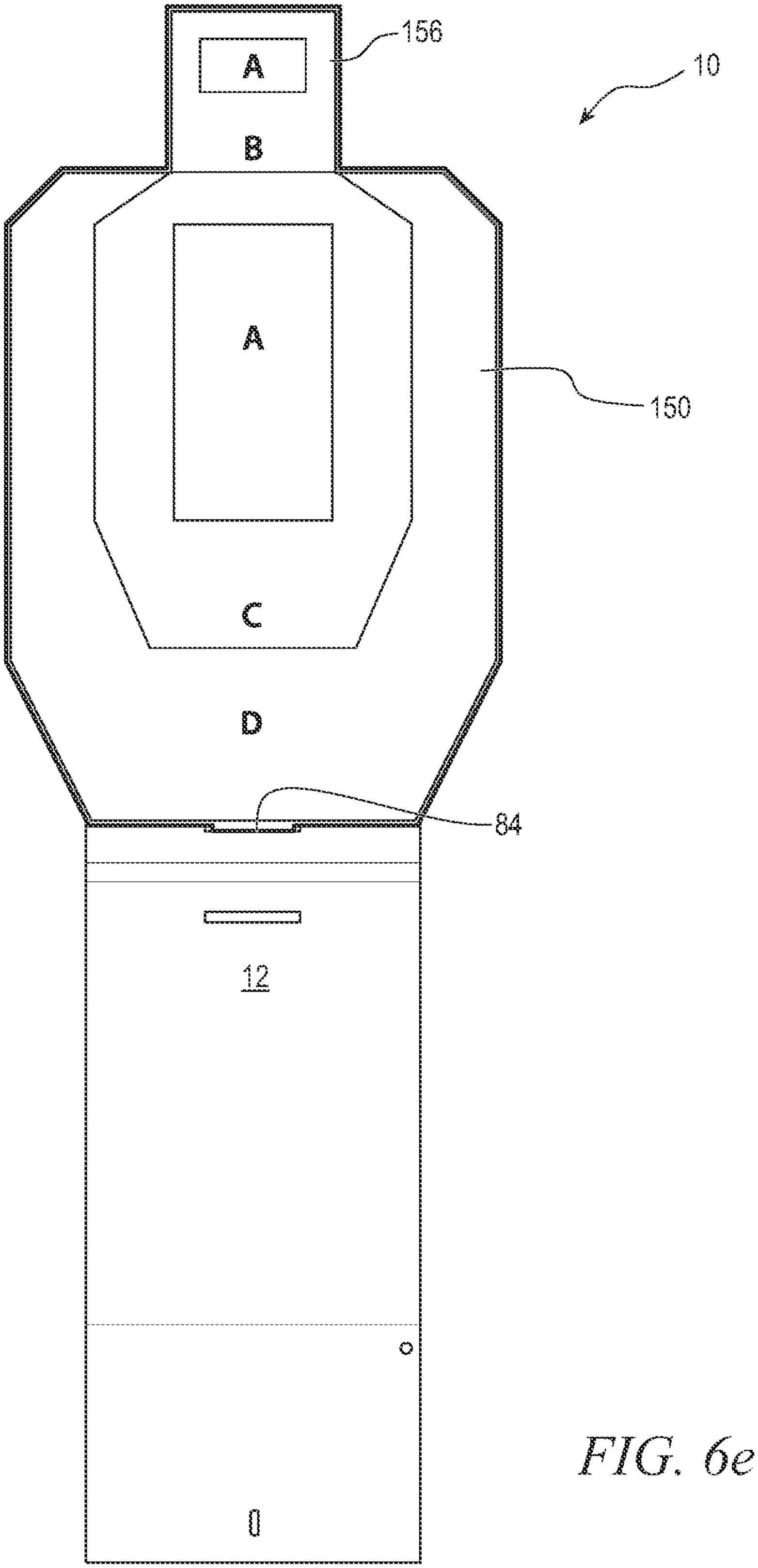

Target 150 is now installed and ready for use as shown in FIG. 6*e*. Having target 150 as a separate accessory allows a full size IPSC target to be used even though box target 10 has insufficient surface area for a full size IPSC target. Accessory targets also extend the life of box target 10 by allowing more exchanging of used targets. Box target 10 by itself can be flipped to use the bottom target, and turned 90 degrees to use another face, but eventually all targets on box target 10 will have too many bullet holes to be useful. However, box target 10 remains structurally sound long after all targets have been used.

A used target 150 full of bullet holes can be changed out for a fresh accessory target without any bullet holes whenever desired. Any number of fresh targets can be used time after time as long as box target 10 remains standing. Even when the underlying targets of box target 10 collects an incredible number of bullet holes, the structural strength of the box target will remain sufficient to hold an accessory target 150.

Target 150 can be any suitable target, whether wider than a side face 12-18 of box target 10 or not. Targets printed on target 150 can include novelty target such as animals or zombies. In some embodiments, additional flaps 84 are formed at different heights on box target 10 for use of different heights of accessory targets. An accessory target can extend down to the bottom half of box target 10, or may only take up the top quarter of the box target.

Box Target 10, with or without accessory targets 150, is useful for target practice of pistol and rifle armament, as well as airsoft, pellet guns, and BB guns. Most airsoft plastic beads pass through the front of box target 10 but do not have enough energy to pass through the back. Thus, airsoft pellets are trapped within box target 10 and can be collected for reloading. The thickness of cardboard 60 can be customized based on expected projectile energy so that a specific combination of firearm and pellet being used results in pellets collected within the box rather than bouncing off the front or going all the way through the back. In some embodiments, the bottom of box target 10 includes a corner pour hole so that captured pellets can be funneled into a container for reuse.

While one or more embodiments of the present invention have been illustrated in detail, the skilled artisan will appreciate that modifications and adaptations to those embodiments may be made without departing from the scope of the present invention as set forth in the following claims.

What is claimed:

1. A firearm target, comprising:

a cardboard substrate folded and glued into a tube including four flat sides of approximately equal size, wherein each flat side is connected to two adjacent flat sides to form the tube;

a plurality of cuts with one of the cuts formed between each adjacent pair of the flat sides at a first end and second end of the tube to provide a flap adjacent to each end of each of the flat sides;

a first score line formed in the cardboard substrate between each pair of adjacent flat sides to allow the tube to be folded flat;

a second score line formed in the cardboard substrate perpendicularly to the first score lines across an entire width of the cardboard substrate at a quarter of the distance from the first end of the tube to the second end of the tube to allow the first end of the tube to be folded to a center of the tube;

a third score line formed in the cardboard substrate perpendicularly to the first score lines across the entire width of the cardboard substrate at a quarter of the distance from the second end of the tube to the first end of the tube to allow the second end of the tube to be folded to the center of the tube; and a pair of fourth score lines formed in the cardboard substrate perpendicularly to the first score lines across the entire width of the cardboard substrate near the center of the tube to allow the tube to be folded in half with the first end of the tube and the second end of the tube internal to the central fold.

2. The firearm target of claim 1, wherein each flap includes a notch centered along an edge of the flap opposite a respective flat side.

3. The firearm target of claim 1, further including a weight disposed around the tube and on each of the flaps of the first end of the tube.

4. The firearm target of claim 1, wherein each of the flaps includes a score line oriented perpendicularly to the cuts and formed across an entire width of each flap, and wherein each of the flaps includes a perforation along the score for half of the entire width of each flap.

5. The firearm target of claim 4, wherein each of the flaps further includes a pair of perforated tabs formed adjacent to the perforation.

6. A firearm target, comprising:

a cardboard substrate folded and glued into a tube including a plurality of flat sides, wherein each flat side is connected to two adjacent flat sides to form the tube; and a plurality of cuts with one of the cuts formed between each adjacent pair of the flat sides at a first end and second end of the tube to provide a flap adjacent to each end of each of the flat sides;

wherein each of the flaps includes a score line oriented perpendicularly to the cuts and formed across an entire width of each flap; and wherein each of the flaps includes a perforation along the score for half of the entire width of each flap.

7. The firearm target of claim 6, wherein the cardboard substrate includes a first score line between each pair of adjacent flat sides to allow the tube to be folded flat.

8. The firearm target of claim 6, wherein each flap includes a notch centered along an edge of the flap opposite a respective flat side.

9. The firearm target of claim 6, further including a weight disposed around the tube and on each of the flaps of the first end of the tube.

10. The firearm target of claim 6, wherein each of the flaps further includes a pair of perforated tabs formed adjacent to the perforation.

11. A firearm target, comprising:

a cardboard substrate folded and glued into a tube including four flat sides of approximately equal size, wherein each flat side is connected to two adjacent flat sides to form the tube;

a first score line formed in the cardboard substrate between each pair of adjacent flat sides to allow the tube to be folded flat;

a second score line formed in the cardboard substrate perpendicularly to the first score lines across an entire width of the cardboard substrate at a quarter of the distance from a first end of the tube to a second end of the tube to allow the first end of the tube to be folded to a center of the tube;

a third score line formed in the cardboard substrate perpendicularly to the first score lines across the entire width of the cardboard substrate at a quarter of the distance from the second end of the tube to the first end of the tube to allow the second end of the tube to be folded to the center of the tube; and a pair of fourth score lines formed in the cardboard substrate perpendicularly to the first score lines across the entire width of the cardboard substrate near the center of the tube to allow the tube to be folded in half with the first end of the tube and the second end of the tube internal to the central fold.

12. The firearm target of claim 11, wherein the cardboard substrate includes a cut between each adjacent pair of the flat sides at a first end of the tube to provide a flap adjacent to each of the flat sides.

13. The firearm target of claim 12, wherein each flap includes a notch centered along an edge of the flap opposite a respective flat side.

14. The firearm target of claim 11, further including a weight disposed around the tube and on each of the flaps.

15. The firearm target of claim 11, wherein each of the flaps includes a score line oriented perpendicularly to the cuts and formed across an entire width of each flap, and wherein each of the flaps includes a perforation along the score for half of the entire width of each flap.

* * * * *